US012162342B2

United States Patent
Balke et al.

(10) Patent No.: US 12,162,342 B2
(45) Date of Patent: Dec. 10, 2024

(54) MOTOR VEHICLE SHELL, IN PARTICULAR FOR A PASSENGER VEHICLE, AND MOTOR VEHICLE, IN PARTICULAR A PASSENGER VEHICLE

(71) Applicant: Mercedes-Benz Group AG, Stuttgart (DE)

(72) Inventors: Clemens Balke, Esslingen (DE); Jan Drechsel, Sindelfingen (DE); Leif Eckle, Wiernsheim (DE); Patrick Heber, Stuttgart (DE); Hans Hofele, Steinheim (DE); Frank Imrecke, Stuttgart (DE); Stefan Lutz, Nagold (DE); Andreas Maier, Uhingen (DE); Franz Maier, Uhingen (DE); Jan-Mark Opelka, Alfdorf Remshalden (DE); Markus Orner, Rennigen (DE); Calixte Rolland, Ostfildern/Ruit (DE); Thomas Weber, Herrenberg (DE)

(73) Assignee: Mercedes-Benz Group AG, Stuttgart (DE)

(*) Notice: Subject to any disclaimer, the term of this patent is extended or adjusted under 35 U.S.C. 154(b) by 329 days.

(21) Appl. No.: 17/765,770

(22) PCT Filed: Sep. 24, 2020

(86) PCT No.: PCT/EP2020/076741
§ 371 (c)(1),
(2) Date: Mar. 31, 2022

(87) PCT Pub. No.: WO2021/063801
PCT Pub. Date: Apr. 8, 2021

(65) Prior Publication Data
US 2022/0371423 A1    Nov. 24, 2022

(30) Foreign Application Priority Data
Oct. 1, 2019   (DE) ............... 10 2019 006 812.2

(51) Int. Cl.
*B60K 1/04* (2019.01)
*B60L 50/64* (2019.01)
(Continued)

(52) U.S. Cl.
CPC ............. *B60K 1/04* (2013.01); *B60L 50/64* (2019.02); *B62D 25/20* (2013.01);
(Continued)

(58) Field of Classification Search
CPC ............. B60K 1/04; B60K 2001/0438; H01M 50/249; H01M 50/24; H01M 50/204; B62D 25/20; B62K 1/04; B60L 50/04
See application file for complete search history.

(56) References Cited

U.S. PATENT DOCUMENTS

| 10,173,511 B2 * | 1/2019 | Hara ................. B60L 50/66 |
| 10,569,633 B2 | 2/2020 | Hara |

(Continued)

FOREIGN PATENT DOCUMENTS

| DE | 10 2017 206 586 A1 | 10/2017 |
| DE | 10 2018 110 481 B3 | 3/2019 |

(Continued)

OTHER PUBLICATIONS

PCT/EP2020/076741, International Search Report dated Dec. 4, 2020 (Two (2) pages).
(Continued)

*Primary Examiner* — John D Walters
(74) *Attorney, Agent, or Firm* — Crowell & Moring LLP

(57) ABSTRACT

A motor vehicle shell of a motor vehicle includes a frame structure that is formed by crossmembers and by longitudinal members. The frame structure is closed peripherally and protrudes downwardly in a vertical direction of the motor vehicle from a base element. A receiving chamber for receiving an electrical energy store is delimited by the frame
(Continued)

structure. A cover is formed separately from the frame structure and is disposed opposite the base element. The receiving chamber is closed downwardly in the vertical direction of the motor vehicle by the cover. An annular and dimensionally stable intermediary element is formed separately from the frame structure and separately from the cover. The intermediary element is disposed between the frame structure and the cover and the intermediary element is fixed at least in a liquid-tight manner on the frame structure by a firmly bonded connection.

10 Claims, 1 Drawing Sheet

(51) Int. Cl.
*B62D 25/20* (2006.01)
*H01M 50/204* (2021.01)
*H01M 50/24* (2021.01)
*H01M 50/249* (2021.01)

(52) U.S. Cl.
CPC ......... *H01M 50/204* (2021.01); *H01M 50/24* (2021.01); *H01M 50/249* (2021.01); *B60K 2001/0438* (2013.01)

(56) References Cited

U.S. PATENT DOCUMENTS

| | | | |
|---|---|---|---|
| 10,906,593 B2 * | 2/2021 | Kellner | B62D 29/008 |
| 11,186,159 B2 * | 11/2021 | Bikmukhametov | B60K 1/04 |
| 2019/0009662 A1 | 1/2019 | Toyota | |

FOREIGN PATENT DOCUMENTS

| | | |
|---|---|---|
| DE | 10 2017 219 895 A1 | 5/2019 |
| DE | 10 2018 206 600 A1 | 10/2019 |

OTHER PUBLICATIONS

German-language German Office Action issued in German application No. 10 2019 006 812.2 dated Oct. 7, 2020 (Five (5) pages).

* cited by examiner

MOTOR VEHICLE SHELL, IN PARTICULAR FOR A PASSENGER VEHICLE, AND MOTOR VEHICLE, IN PARTICULAR A PASSENGER VEHICLE

BACKGROUND AND SUMMARY OF THE INVENTION

The invention relates to a motor vehicle shell, in particular for a passenger vehicle. Furthermore, the invention relates to a motor vehicle, in particular a passenger vehicle, having such a motor vehicle shell.

Such a motor vehicle shell for a motor vehicle, in particular for a passenger vehicle, is known from DE 10 2017 219 895 A1. The motor vehicle shell has a frame structure, which is formed by crossmembers, spaced apart from one another in the longitudinal direction of the vehicle, of the motor vehicle shell and by longitudinal members, spaced apart from one another in the transverse direction of the vehicle, of the motor vehicle shell. The frame structure is closed peripherally and, in the vertical direction of the vehicle, protrudes downwardly from a base element of the motor vehicle shell. A receiving chamber for at least partially receiving an electrical energy store is delimited by the frame structure. Moreover, the motor vehicle shell comprises a cover formed separately to the frame structure and arranged opposite the base element in the vertical direction of the vehicle and spaced apart from the base element, by means of which cover the receiving chamber is closed or covered downwardly in the vertical direction of the vehicle.

The object of the present invention is to create a motor vehicle shell and a motor vehicle, such that the receiving chamber can be sealed particularly advantageously.

The motor vehicle shell which is also referred to as the bodywork shell, shell, bodywork support structure or bodywork, and preferably formed as a self-supporting bodywork and which preferably delimits an interior for occupants of a motor vehicle preferably formed as a passenger vehicle, comprises a frame structure, which is formed by crossmembers, spaced apart from one another in the longitudinal direction of the vehicle, of the motor vehicle shell and by longitudinal members, spaced apart from one another in the transverse direction of the vehicle, of the motor vehicle shell, for example side rocker panels, and is closed peripherally. This means that the frame structure is formed to be completely peripherally closed by the crossmembers and the longitudinal members in its peripheral direction, such that the frame structure can be formed at least substantially annularly. The crossmembers are formed separately from one another and separately from the longitudinal members, wherein the longitudinal members, for example, are formed separately from one another. The crossmembers and the longitudinal members are also collectively referred to as supports of the motor vehicle shell, wherein the supports can be connected to one another at least indirectly, in particular directly. In particular, it is conceivable that the crossmembers are connected to one another via the longitudinal members or vice versa, wherein the respective longitudinal member, for example, can be connected to the respective crossmembers at least indirectly, in particular directly.

The frame structure protrudes downwardly in the vertical direction of the vehicle from a base element of the motor vehicle shell. The base element is, for example, a component of a base of the motor vehicle shell, also referred to as the main base, wherein the interior mentioned above is delimited at least partially, in particular at least extensively or completely, by the base element downwardly in the vertical direction of the vehicle. A receiving chamber is delimited by the frame structure, in particular completely peripherally in its peripheral direction. An electrical energy store can be received or is received in the receiving chamber. Electrical energy or electrical [lacuna] can be supplied by means of the electrical energy store, with which at least one electrical engine can be supplied for electrically driving the motor vehicle, in particular driving it purely electrically. The receiving chamber is delimited or sealed above in the vertical direction of the vehicle by the base element. For example, the electrical energy store is formed as a high voltage battery, by means of which particularly high electrical powers can be implemented for electrically driving, in particular purely electrically, the motor vehicle.

Moreover, the motor vehicle shell comprises a cover formed separately from the frame structure and thus separately from the longitudinal members and separately from the crossmembers, which cover is arranged opposite the base element in the vertical direction of the vehicle and is spaced apart from the base element. The receiving chamber is closed downwardly in the vertical direction of the vehicle by the cover, and is thus delimited or sealed. In order to now be able to seal the receiving chamber particularly advantageously, an annular and dimensionally stable intermediary element formed separately from the frame structure and separately from the cover is, according to the invention, arranged between the frame structure and the cover, the intermediary element also being referred to as an adapter element or, due to its annular shape, as a ring structure. In other words, the intermediary element is closed completely peripherally in its peripheral direction. The intermediary element is fixed at least in a liquid-tight manner on the frame structure by means of at least one firmly bonded connection. This means that the intermediary element is connected in a firmly bonded manner to the frame structure by means of the firmly bonded connection and is thus fixed to the frame structure in a firmly bonded manner. Moreover, the intermediary element is sealed to the frame structure at least in a liquid-tight manner by means of the firmly bonded connection, such that no liquids, such as water, for example, can flow through from outside between the frame structure and the intermediary element and penetrate the receiving chamber.

The knowledge underlying the invention is that there is a joint, in particular a butt joint, between the respective longitudinal members and the respective crossmembers, since the respective longitudinal member, for example, is arranged on the respective crossmember by forming the respective joint, in particular formed as a butt joint, and is connected to the respective crossmember. Moreover, it can result in steps, caused by finishing tolerances, at respective transitions between the longitudinal members and the crossmembers, in particular in a region of edge surfaces to be sealed. If no corresponding countermeasures are made, the joints and the possibly existing steps exacerbate the implementation of consistent quality of the seal of the receiving chamber, also referred to as the construction chamber, to the surroundings, in particular in serial production of vehicles. In comparison, the intermediary element now makes it possible to seal the construction chamber, in particular in serial or mass production, with a consistently high degree of quality. The intermediary element, which is also referred to as a ring structure, for example, due to its annular design, can bridge the joints and the steps, such that these do not impair the seal of the receiving chamber. In particular, the intermediary element continuously bridges, i.e., reaches between without interruption, the respective joint in such a way that a single-piece wall region of the intermediary element extends from one of the supports to the other of the supports via the joint arranged between the one support and the other support.

By means of the firmly bonded connection, the respective wall region or the ring structure overall can be fixed at least in a liquid-tight manner, i.e., at least tightly for liquids, on the frame structure, such that a particularly advantageous seal of the receiving chamber can be depicted. For its part, the cover, for example, can be sealed particularly easily to the sealing element, such that a consistently high degree of quality of the seal of the construction space can also be ensured during serial production.

In an embodiment of the invention, the intermediary element is arranged on respective surfaces, pointing downwards in the longitudinal direction of the vehicle, of the longitudinal members and the crossmembers. Here, the intermediary element is, for example, applied to the respective surfaces. Thus, the intermediary element can be sealed particularly advantageously to the frame structure, such that a particularly advantageous tightness of the receiving chamber can be ensured.

A further embodiment is characterized in that the firmly bonded connection is arranged between the surfaces and the intermediary element in the vertical direction of the vehicle. In doing so, the surfaces, also referred to as frame structure surfaces, can be sealed at least in a liquid-tight manner particularly well, such that the receiving chamber can also in particular be sealed particularly well when, in terms of the frame structure, there are joints between the supports and steps possibly caused by tolerances.

In a particularly advantageous embodiment of the invention, the intermediary element forms a peripherally closed sealing surface pointing downwards in the vertical direction of the invention, on which sealing surface a sealing element, in particular formed separately from the cover and separately from the intermediary element, is directly supported, i.e., on which it abuts directly. The cover is sealed to the intermediary element at least in a liquid-tight manner by means of the sealing element. Thus, while the intermediary element for its part is sealed to the frame structure and, here, is fixed to the frame structure by means of the firmly bonded connection, such that the joints and the possibly existing steps are bridged or compensated for, the adapter or intermediary element provides the peripheral sealing surface. On the sealing surface, the sealing element, for example, is brought into abutment, which is then located between the sealing surface of the intermediary element and the cover. Since the sealing surface, on which the sealing element abuts, is formed by the intermediary element and not by the frame structure, for example, the sealing surface is subjected to substantially less strong tolerance influences. Thus, the receiving chamber can be sealed particularly well.

In order to implement a particularly advantageous tightness of the receiving chamber in a particularly simple manner, it is provided in an embodiment of the invention that the sealing surface is at least substantially flat. In particular, the sealing surface preferably extends on a plane spanned by the longitudinal direction of the vehicle and the transverse direction of the vehicle and also referred to as the x-y plane.

It has furthermore been shown to be particularly advantageous when the sealing element, which is formed from rubber, for example, is supported or abuts on one side directly on the sealing surface and, on the other side, directly on a further sealing surface formed by the cover. Thus, the construction chamber can be sealed with a consistently high degree of quality, in particular in serial or mass production.

In a further design of the invention, the intermediary element is formed from a high-strength steel. Thus, a very high degree of quality of the sealing surface and thus the seal of the construction chamber can be implemented.

It has furthermore been shown to be particularly advantageous when the intermediary element is reshaped by roller profiling and is preferably joined together to form a closed component. Thus, the intermediary element can be sealed particularly advantageously on one side to the frame structure and, on the other side, to the cover.

The intermediary element is formed in one piece, for example, or the intermediary element is made up of components formed separately from one another and connected to one another.

In order to be able to seal the construction chamber particularly well, it is provided in a further design of the invention that the intermediary element together with the frame structure is lacquered, in particular by a cathodic dip coating (KTL). In other words, as part of a method for producing the motor vehicle shell according to the invention, the ring structure, for example, is fixed to the frame structure in a vehicle plant by forming the firmly bonded connection and is sealed at least in a liquid-tight manner to the frame structure by means of the firmly bonded connection. Then, the frame structure and the intermediary element fixed to the frame structure pass through a KTL bath, whereby the frame structure and the intermediary element fixed to it are lacquered together or simultaneously.

Finally, it has been shown to be particularly advantageous when the firmly bonded connection comprises a welded connection and/or an adhesive connection between the frame structure and the intermediary element. In other words, it is preferably provided that the intermediary element is fixed to the frame structure by adhesion and/or welding and is sealed at least in a liquid-tight manner to the frame structure. Thus, a particularly good tightness of the construction chamber can be ensured. Thus, it is provided for example as part of the method mentioned above that the ring structure is adhered or welded in the vehicle plant in or to the frame structure and then masses through the KTL bath with the frame structure.

The motor vehicle according to the invention, preferably formed as a passenger vehicle, is characterized in that the motor vehicle has a motor vehicle shell according to the invention. Advantages and advantageous designs of the motor vehicle shell according to the invention are to be seen as advantages and advantageous designs of the motor vehicle according to the invention, and vice versa.

Further advantages and details of the invention emerge from the description below and the drawings.

DETAILED DESCRIPTION OF THE DRAWINGS

Figure 1:
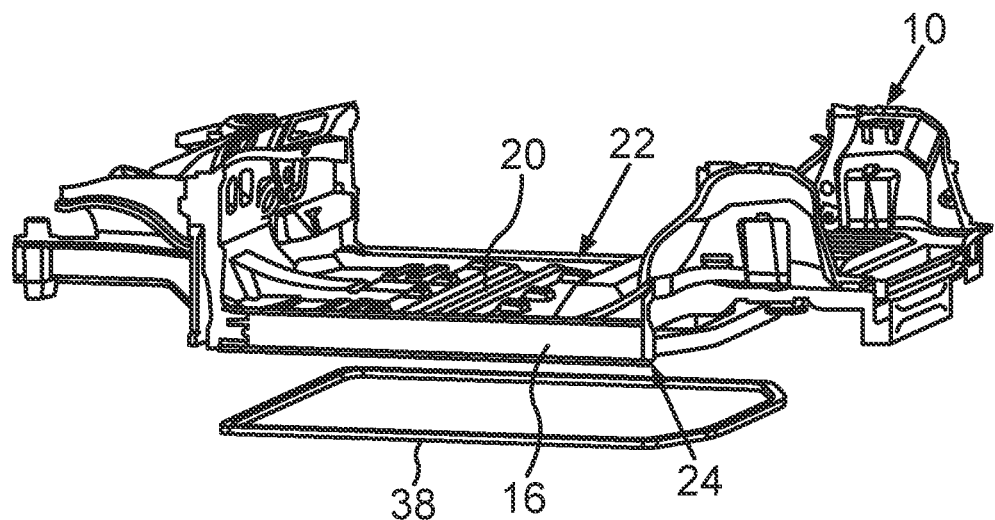
FIG. 1 is a schematic and lateral exploded view of a motor vehicle shell, having a frame structure, by which a receiving chamber is partially delimited to receive an electrical energy store, having a cover formed separately from the frame structure, by which the receiving chamber is closed downwardly in the vertical direction of the invention, and having a ring structure arranged between the frame structure and the cover and formed separately from the frame structure and separately from the cover, which ring structure is fixed at least in a liquid-tight manner by means of at least one firmly bonded connection.

In FIG. 1, a motor vehicle shell 10 for a motor vehicle, in particular for a passenger vehicle, is partially shown in a lateral exploded view. The motor vehicle shell 10 delimits, for example at least partially, the interior chamber of the motor vehicle, in which people can stay, in particular when the motor vehicle is travelling.

Figure 2:
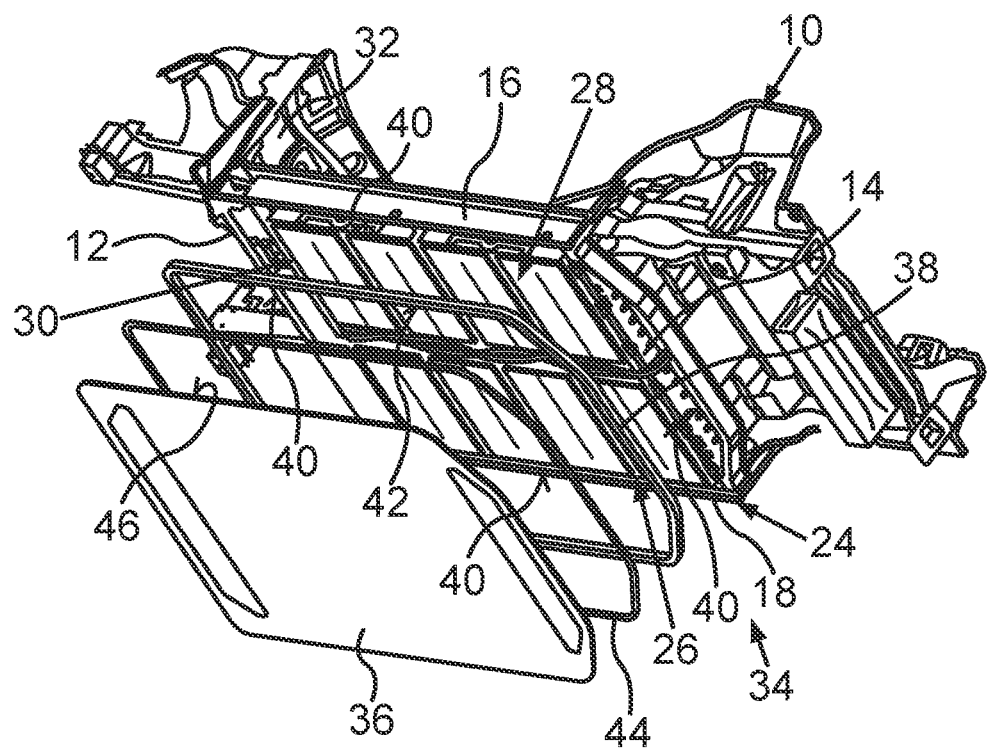
FIG. 2 is a schematic exploded view of the motor vehicle shell.

When looking together with FIG. 2, it can be seen particularly easily that the motor vehicle shell 10 has crossmembers 12 and 14, which are spaced apart from one another in the longitudinal direction of the vehicle. Moreover, the motor vehicle shell 10 comprises longitudinal members 16 and 18, which are spaced apart from one another in the transverse direction of the vehicle. The longitudinal members 16, 18 are here formed from side rockers panels often referred to as rockers for short.

Moreover, the motor vehicle shell 10 comprises at least one base element 20, which is, for example, a component of a base 22 of the motor vehicle shell 10, also referred to as the main base or forms the base 22, in particular the entire base. Here, in the completely produced state of the motor vehicle, its interior chamber is delimited downwardly at least partially, in particular at least extensively or completely, by the base element 22 or the base 20. Here, the base element 20 can be connected at least indirectly, in particular directly, to the longitudinal members 16 and 18 and to the crossmembers 12 and 14. The crossmembers 12 and 14 and the longitudinal members 16 and 18 are also referred to as supports. Here, the longitudinal members 16, 18, for example, form respective side rocker panels of the motor vehicle shell 10. In a different exemplary embodiment not depicted in the figures, it is provided that the crossmembers 12 and 14 and the longitudinal members 16 and 18 are components of the base 22.

It can be seen particularly well from FIG. 2 that a peripherally closed frame structure 24 is formed by the crossmembers 12 and 14 and by the longitudinal members 16 and 18, frame structure being completely peripherally sealed in its peripheral direction. In doing so, the frame structure 24 partially delimits a receiving chamber 26, in which an electrical energy store 28 of the motor vehicle can be received or is received. The receiving chamber 26 is delimited upwardly in the vertical direction of the vehicle by the base element 20, i.e., is closed or sealed. The frame structure 24 extends completely peripherally in the peripheral direction of the receiving chamber 26 and is thus peripherally closed, such that the receiving chamber 26 is delimited upwardly on both sides in the transverse direction of the vehicle and to the front and to the back in the longitudinal direction of the vehicle by the frame structure 24.

The electrical energy store 28 comprises several modules 30, which are arranged in the receiving chamber 26 also referred to as the construction chamber. The respective module 30 has several storage cells, for example, which are electrically connected to one another. Electrical energy or electrical current can be stored by means of the storage cells and thus by means of the energy store 28. In its completely produced state, the motor vehicle comprises at least one electrical engine, by means of which the motor vehicle can be driven electrically, in particular purely electrically. Thus, the motor vehicle is preferably formed as a hybrid or electric vehicle, in particular as a battery electric vehicle (BEV).

In order to electrically drive the motor vehicle by means of the electrical engine, the electrical engine is supplied with the electrical energy that is stored in the energy store 28. For example, the energy store 30 is formed as a battery, in particular as a high voltage battery (HV battery). Furthermore, it is conceivable that at least one or more further electronic and/or electric components are arranged in the receiving chamber 26, which are used, for example, to electrically drive the motor vehicle and/or to supply the electrical engine with the electrical energy stored in the energy store 28. The receiving chamber 26 and thus, for example, the energy store 28 also referred to as a high voltage store, extend in the longitudinal direction of the vehicle, for example, from an end face wall 32 of the motor vehicle shell 10 up to a boot 34. Here, the interior, for example, is delimited to the front, in the longitudinal direction of the vehicle, at least partially by the end face wall 32. In particular, the receiving chamber 26, for example, extends backwards in the longitudinal direction of the vehicle at least up to a bench which can then be arranged above a part of the receiving chamber 26 in the vertical direction of the vehicle.

Furthermore, a cover 36 formed separately from the frame structure 24 is provided, which is arranged opposite the base element 20 in the vertical direction of the vehicle and is spaced apart from the base element 20. The receiving chamber 26 is closed downwardly in the vertical direction of the vehicle by the cover 36, i.e., delimited or sealed.

In order to now be able to seal the receiving chamber 26 particularly advantageously, an annular and dimensionally stable, i.e., inherently rigid, intermediary element 38 formed separately from the frame structure 24 and separately from the cover 36 is arranged between the frame structure 24 and the cover 36 in the vertical direction of the vehicle, the intermediary element being completely peripherally closed in its peripheral direction and thus in the peripheral direction of the receiving chamber 26. Due to its annular design, the intermediary element 38 also referred to as an adapter element is fixed at least in a liquid-tight manner on the frame structure 24 by means of at least one firmly bonded connection. Thus, no liquids, such as water from the surroundings of the motor vehicle shell 10, for example, can flow through between the intermediary element 38 and the frame structure 24 and penetrate the receiving chamber 26.

It can be seen overall from FIGS. 1 and 2 that the frame structure 24 extends completely in the peripheral direction of the receiving chamber 26 and thus around a first part of the receiving chamber 26 in a peripherally closed manner. The intermediary element 38 is attached to the frame structure 24 downwards in the vertical direction of the vehicle, such that the annular intermediary element 38 extends completely in the peripheral direction of the receiving chamber 26 and thus around a second part of the receiving chamber 26 in a closed peripheral manner, the second part of which is attached to the first part mentioned above downwardly in the vertical direction of the vehicle. Here, the intermediary element 38 is arranged on respective surfaces 40 of the supports pointing downwards in the longitudinal direction of the vehicle and is attached, in particular, to the surfaces 40. Here, it is preferably provided that the firmly bonded connection not depicted in more detail is arranged between the surfaces 40 and the intermediary element 38 in the vertical direction of the vehicle. The surfaces 40 are sealed at least in a fluid-tight manner to the intermediary element 8 by means of the firmly bonded connection or vice versa, such that a particularly good seal can be implemented. Joints, in particular, between the respective supports can be bridged by means of the intermediary element 38, such that there can be an advantageous seal, even in the region of the respective joints. Here, the intermediary element 38 forms a sealing surface 42 that is completely peripheral in the peripheral direction of the receiving chamber 26 and thus closed, pointing downwards in the vertical direction of the vehicle, on which sealing surface a sealing element 44 formed separately from the intermediary element 38 and separately from the cover 36 and formed from rubber, for example, is supported, i.e., on which it abuts directly. Here, the sealing element 44 is arranged between the sealing surface 42 and the cover 36 in the vertical direction pf the vehicle, whereby the cover 36 is sealed particularly well to the intermediary element 8. Thus, the receiving chamber 26 can be sealed particularly well against liquids from the surroundings.

In the exemplary embodiment shown in the figures, the sealing surface 42 is flat or at least substantially flat, wherein the sealing surface 42 extends on a plane, also referred to as the x-y plane, spanned by the transverse direction of the vehicle and the longitudinal direction of the vehicle. The cover 36 is also preferably formed to be flat and extends in the x-y plan. The cover 36 preferably forms a further sealing surface 46 facing towards the sealing surface 42 and thus pointing upwards in the vertical direction of the vehicle. Here, the sealing surface 44 is supported upwardly in the vertical direction of the vehicle and thus, on one side, directly on the sealing surface 42 and downwardly in the vertical direction of the vehicle and thus, on the other side, directly on further sealing surfaces 46, such that there can be a particularly simple and qualitative high-value seal of the receiving chamber 26.

The intermediary element 38 is preferably formed from a high-strength steel and is reshaped by roller profiling and is preferably joined together to form a closed component. Here, it is conceivable, in particular, that the intermediary element 38 is formed as a single piece. For example, the intermediary element 38 is moulded from a single-piece component, in particular in that respective inherently free ends of the component can be moved towards one another by reshaping the component. The free ends are joined together, for example, whereby the annular intermediary element 38 is formed. In particular, the component is reshaped by roller profiling.

In order to be able to seal the intermediary element 38 particularly well to the frame structure 24, it is preferably provided that the intermediary element 38 is fixed to the frame structure 24, in particular in a vehicle plant, to produce the motor vehicle shell 10, and is lacquered to the frame structure 24 subsequently or simultaneously. To do so, the frame structure 24, for example, with the intermediary element 38 attached to it, passes through a lacquer bath, formed in particular as an immersion bath, into which the frame structure 24 and the intermediary element 38 fixed to it are immersed. In doing so, the frame structure 24, for example, and the intermediary element 38 fixed thereon are lacquered together and thus simultaneously by means of a cathodic dip coating (KTL).

In order to be able to ensure a particularly good seal of the receiving chamber 26, the firmly bonded connection comprises, for example, a welded connection and/or an adhesion connection between the frame structure 24 and the intermediary element 38. Thus, for example as part of the method mentioned above, the intermediary element 38 is adhered and welded in or on the frame structure 24.

The invention claimed is:

1. A motor vehicle shell of a motor vehicle, comprising:
    a frame structure, wherein the frame structure is formed by crossmembers spaced apart from one another in a longitudinal direction of the motor vehicle and by longitudinal members spaced apart from one another in a transverse direction of the motor vehicle, wherein the frame structure is closed peripherally and protrudes downwardly in a vertical direction of the motor vehicle from a base element, and wherein a receiving chamber for receiving an electrical energy store is delimited by the frame structure;
    a cover, wherein the cover is formed separately from the frame structure and is disposed opposite the base element and wherein the receiving chamber is closed downwardly in the vertical direction of the motor vehicle by the cover; and
    an annular and dimensionally stable intermediary element, wherein the intermediary element is formed separately from the frame structure and separately from the cover, wherein the intermediary element is disposed between the frame structure and the cover, and wherein the intermediary element is fixed at least in a liquid-tight manner on the frame structure by a firmly bonded connection;
    wherein the intermediary element forms a peripherally closed sealing surface pointing downwards in the vertical direction of the motor vehicle, wherein a sealing element is directly supported on the sealing surface, and wherein the cover is sealed by the sealing element to the intermediary element in a liquid-tight manner.

2. The motor vehicle shell according to claim 1, wherein the intermediary element is disposed on respective surfaces of the longitudinal members and the crossmembers.

3. The motor vehicle shell according to claim 2, wherein the firmly bonded connection is disposed between the respective surfaces and the intermediary element in the vertical direction of the motor vehicle.

4. The motor vehicle shell according to claim 1, wherein the sealing surface is flat.

5. The motor vehicle shell according to claim 1, wherein the sealing element is directly supported on the sealing surface on a first side of the sealing element and is directly supported on a second sealing surface formed by the cover on a second side of the sealing element.

6. The motor vehicle shell according to claim 1, wherein the intermediary element is formed from a high strength steel and/or is reshaped by roll profiling and/or is made up of several components formed separately from one another and connected to one another.

7. The motor vehicle shell according to claim 1, wherein the intermediary element is lacquered together with the frame structure by a cathodic dip coating.

8. The motor vehicle shell according to claim 1, wherein the firmly bonded connection is a welded connection or an adhesive connection.

9. A motor vehicle, comprising:
    the motor vehicle shell according to claim 1.

10. The motor vehicle according to claim 9, wherein the motor vehicle is a passenger vehicle.

* * * * *